United States Patent
Imai et al.

(10) Patent No.: US 8,971,469 B2
(45) Date of Patent: Mar. 3, 2015

(54) SERIAL DATA COMMUNICATION METHOD AND SERIAL DATA COMMUNICATION DEVICE

(75) Inventors: Masahiro Imai, Osaka (JP); Nobuaki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 83 days.

(21) Appl. No.: 13/819,301

(22) PCT Filed: Aug. 24, 2011

(86) PCT No.: PCT/JP2011/069030
§ 371 (c)(1),
(2), (4) Date: Feb. 26, 2013

(87) PCT Pub. No.: WO2012/029602
PCT Pub. Date: Mar. 8, 2012

(65) Prior Publication Data
US 2013/0170575 A1 Jul. 4, 2013

(30) Foreign Application Priority Data

Aug. 31, 2010 (JP) ................................ 2010-194792

(51) Int. Cl.
*H04L 7/00* (2006.01)
*H04L 1/00* (2006.01)
(Continued)

(52) U.S. Cl.
CPC ............... *H04L 1/0001* (2013.01); *G06F 1/10* (2013.01); *G06F 13/4282* (2013.01); *H04L*

(58) Field of Classification Search
CPC ..... H04L 25/0266; H04L 7/033; H04L 25/06; H04L 5/023; H04L 25/0272; H04L 25/0292; H04L 25/028; H04L 25/08; H04L 7/0008; H04L 7/0083; H04L 7/0337; H04L 7/0338; H04L 7/0331; H04J 3/0685; H04J 3/0688; H04J 3/0638; H04J 3/0608; H04J 3/0632; H04J 3/0626; H04J 3/06; H04J 3/00; H04J 3/0682; H03L 7/00; H03L 7/0814; H03L 7/085; H03L 7/0891; H03L 7/18; H03L 7/093; H03L 7/087; H03L 7/10; H03L 2207/50; H03L 7/095; H03L 7/107; H03L 7/089; H06F 1/12; H06F 1/14; H06F 1/10; H06F 5/06; H06F 13/1689; H06F 1/08; H06F 1/04; H06F 1/3203; H06F 9/4825; H06F 11/0757; H06F 11/3419
USPC ......... 375/356, 357, 257, 258, 220, 371, 373; 327/162, 163, 144, 145, 156, 159; 370/516, 517, 519; 713/400, 401, 505, 713/500, 502

See application file for complete search history.

(56) References Cited

U.S. PATENT DOCUMENTS

2005/0268140 A1* 12/2005 Lin et al. ........................ 713/500
2006/0188047 A1*  8/2006 Chang et al. ................... 375/355

(Continued)

FOREIGN PATENT DOCUMENTS

JP    2008-118683 A    5/2008
JP    2008-526073 A    7/2008

(Continued)

OTHER PUBLICATIONS

International Search Report corresponding to PCT/JP2011/069030, dated Oct. 18, 2011.

*Primary Examiner* — Phuong Phu
(74) *Attorney, Agent, or Firm* — Lowe Hauptman & Ham, LLP (57) ABSTRACT

A master device and slave devices are connected with each other through an SDA and an SCL, and at least one of a serial communication data signal communicated through the SDA and a serial communication clock signal communicated through the SCL is latched with use of a noise removal clock signal whose frequency is higher than that of the serial communication clock signal, and is taken in.

9 Claims, 7 Drawing Sheets

(51) Int. Cl.
*G06F 1/10* (2006.01)
*G06F 13/42* (2006.01)
*H04L 25/02* (2006.01)

(52) U.S. Cl.
CPC ... 7/0008 (2013.01); *G06F 13/4291* (2013.01); *H04L 25/0264* (2013.01)
USPC ........... 375/356; 375/357; 375/257; 375/220; 375/371; 375/373; 327/162; 327/163; 370/516; 370/517; 370/519; 713/400; 713/401

(56) References Cited

U.S. PATENT DOCUMENTS

| | | |
|---|---|---|
| 2008/0123780 A1 | 5/2008 | Choi |
| 2008/0304599 A1 | 12/2008 | Furtner |
| 2009/0206897 A1* | 8/2009 | Kim et al. ............... 327/158 |
| 2010/0085084 A1* | 4/2010 | Kim et al. ............... 327/108 |

FOREIGN PATENT DOCUMENTS

| | | |
|---|---|---|
| JP | 2008-197752 A | 8/2008 |
| WO | 2012046634 A1 | 4/2012 |

\* cited by examiner

SERIAL DATA COMMUNICATION METHOD AND SERIAL DATA COMMUNICATION DEVICE

RELATED APPLICATIONS

The present application is a National Phase of International Application Number PCT/JP2011/069030, filed Aug. 24, 2011, and claiming priority from Japanese Application Number 2010-194792, filed Aug. 31, 2010.

TECHNICAL FIELD

The present invention relates to a serial data communication method and a serial data communication device. In particular, the present invention relates to a serial data communication method and a serial data communication device, each of which employs an I2C method.

BACKGROUND ART

An I2C (inter-integrated circuit) method and an SPI (serial peripheral interface) method are widely used because (A) communication by use of the I2C and SPI methods, which are synchronous serial transmission, can be carried out at a higher speed than that by use of non-synchronous serial transmission (serial transmission such as RS-232C) and (B) a plurality of slave devices can be connected.

Specifically, the I2C method is a serial transmission interface specification proposed and disclosed by Royal Philips Electronics. An I2C bus includes two signal lines, i.e., a clock signal line SCL and a data signal line SDA (in addition to GND), and can be connected to a plurality of slave devices. A master device selects one slave device from the plurality of slave devices and designates an address which has been given to the one slave device. Then the master device communicates with the slave device thus designated.

Figure 6:
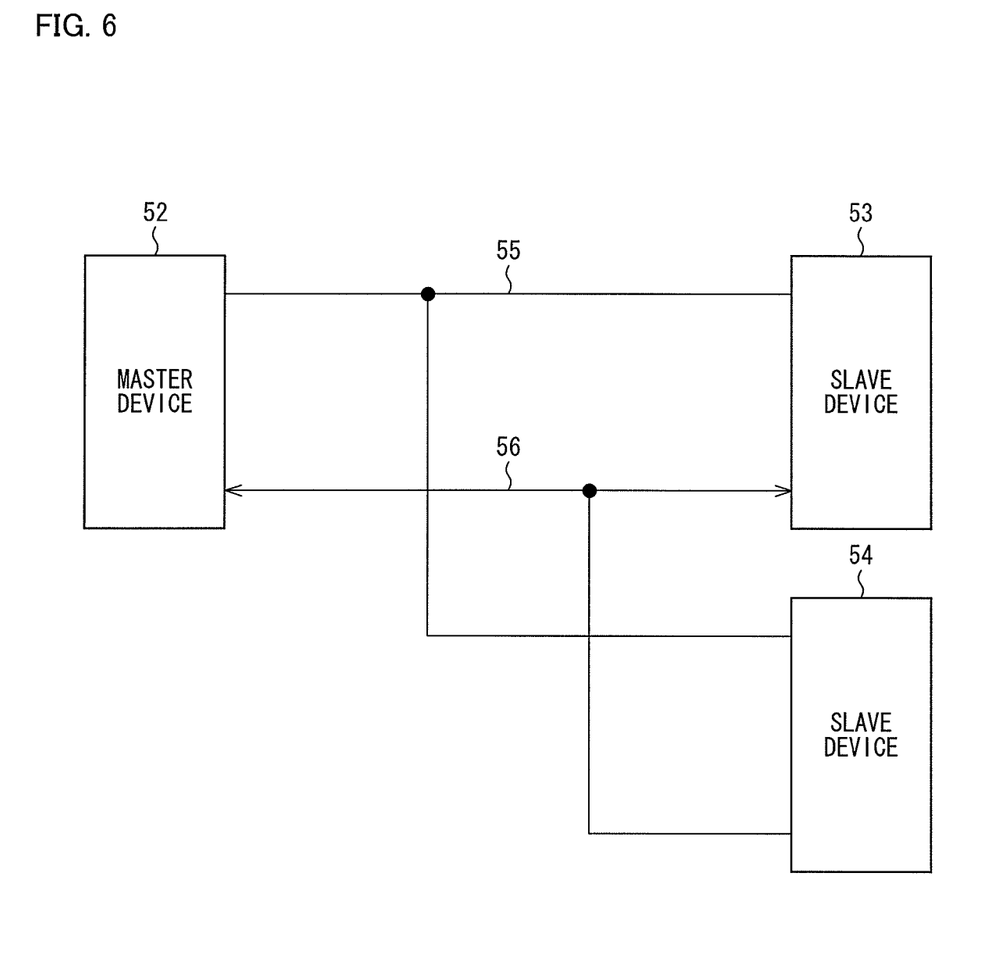
FIG. 6 is a block diagram explaining transmission of data with use of an I2C bus.

FIG. 6 is a block diagram explaining transmission of data with use of an I2C bus.

As shown in FIG. 6, a master device 52 and slave devices 53 and 54 are connected to each other through an SCL 55 and an SDA 56. The SCL 55 is a clock signal line for transmitting a clock signal and the SDA 56 is a data signal line for transmitting data, addresses, and the like. The slave devices 53 and 54 have own addresses, so that the master device 52 selects one slave device, designates an address of the one slave device, and then communicates with the slave device.

CITATION LIST

Patent Literature

Patent Literature 1
Japanese Patent Application Publication, Tokukai, No. 2008-197752 A (Publication date: Aug. 28, 2008)

SUMMARY OF INVENTION

Technical Problem

However, in a case where the master device 52 and the slave devices 53 and 54 are communicated with each other through the I2C bus, noise is likely to be superimposed on a clock signal or a data signal, and therefore malfunction is likely to occur.

Figure 7:
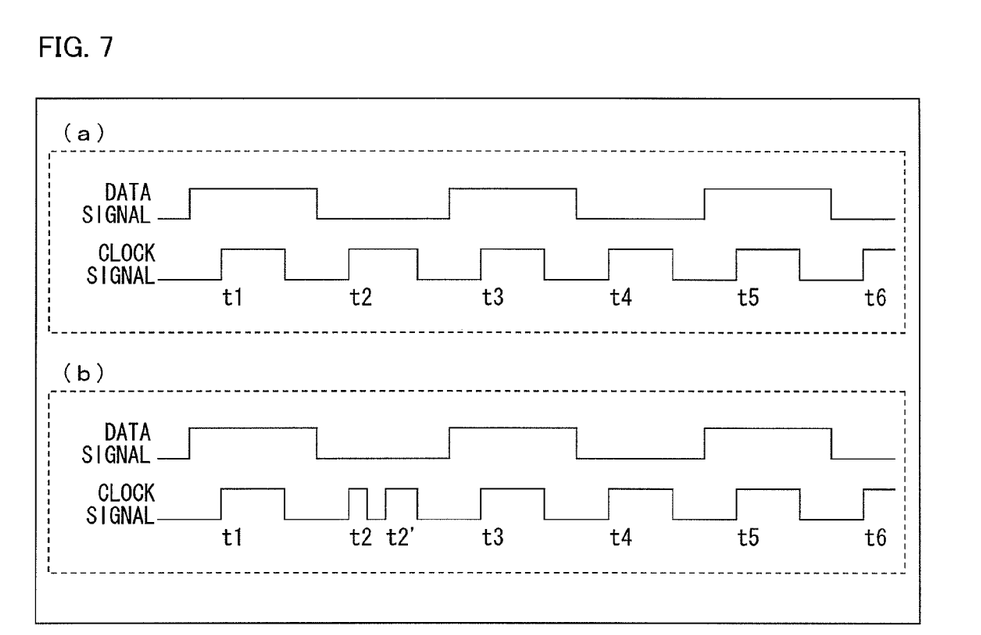

For example, in a case where a master device and a slave device communicate with each other as shown in (a) of FIG. 7, HLHLHL should be sampled as data of serial transmission at a timing of t1, t2, ..., t6. However, as shown in (b) of FIG. 7, it is possible that noise is superimposed on a clock signal and then HLLHLHL is sampled as the data of the serial transmission at a timing of t1, t2, t2', ..., t6.

The present invention has been made in view of the aforementioned problem, and an object of the present invention is to provide a serial data communication method and a serial data communication device, each of which can reduce malfunction caused by noise.

Solution to Problem

In order to achieve the aforementioned object, a serial data communication method of the present invention with use of a data line and a clock line, includes the steps of: latching at least one of a data signal communicated through the data line and a clock signal communicated through the clock line, the latching being carried out with use of a signal whose frequency is higher than that of the clock signal; and taking in the at least one of the data signal and the clock signal.

According to the method, it is possible to remove noise that has been superimposed on the at least one of the clock signal and the data signal. This can reduce occurrence of malfunction.

In order to achieve the aforementioned object, a serial data communication device of the present invention, in which a master device and a slave device are connected to each other with use of at least a data line and a clock line, the serial data communication device includes a noise removal section for latching at least one of a data signal communicated through the data line and a clock signal communicated through the clock line, the latching being carried out with use of a second clock signal whose frequency is higher than that of the clock signal, and taking in the at least one of the data signal and the clock signal.

According to the configuration, it is possible to remove noise that has been superimposed on at least one of the clock signal and the data signal. This can reduce occurrence of malfunction.

Advantageous Effects of Invention

A serial data communication method of the present invention with use of a data line and a clock line, includes the steps of: latching at least one of a data signal communicated through the data line and a clock signal communicated through the clock line, the latching being carried out with use of a signal whose frequency is higher than that of the clock signal; and taking in the at least one of the data signal and the clock signal.

Meanwhile, a serial data communication device of the present invention, in which a master device and a slave device are connected to each other with use of at least a data line and a clock line, the serial data communication device includes a noise removal section for latching at least one of a data signal communicated through the data line and a clock signal communicated through the clock line, the latching being carried out with use of a second clock signal whose frequency is higher than that of the clock signal, and taking in the at least one of the data signal and the clock signal.

It is therefore possible to provide a serial communication method and a serial communication device, each of which can reduce malfunction caused by noise.

BRIEF DESCRIPTION OF DRAWINGS

FIG. 3

(a) through (c) of FIG. 3 are circuit diagrams. (a) of FIG. 3 shows an example configuration of a noise removal section in accordance with an embodiment of the present invention, (b) of FIG. 3 shows another example configuration of the noise removal section in accordance with an embodiment of the present invention, and (c) of FIG. 3 shows still another example configuration of the noise removal section in accordance with an embodiment of the present invention.

FIG. 4

(a) through (c) of FIG. 4 are signal waveform diagrams. (a) of FIG. 4 is a diagram explaining that the noise removal section shown in (a) of FIG. 3 removes noise, (b) of FIG. 4 is a diagram explaining that the noise removal section shown in (b) of FIG. 3 removes noise, and (c) of FIG. 4 is a diagram explaining that the noise removal section shown in (c) of FIG. 3 removes noise.

FIG. 7

(a) and (b) of FIG. 7 are signal waveform diagrams explaining that noise is superimposed on a clock signal and an error occurs in sampling of a data signal.

DESCRIPTION OF EMBODIMENTS

An embodiment of the present invention will be described below with reference to FIG. 1 through FIG. 5.

Note that an embodiment of the present invention will discuss, as an example, a case where an I2C method is used as a serial communication method.

(Whole Configuration)

Figure 1:
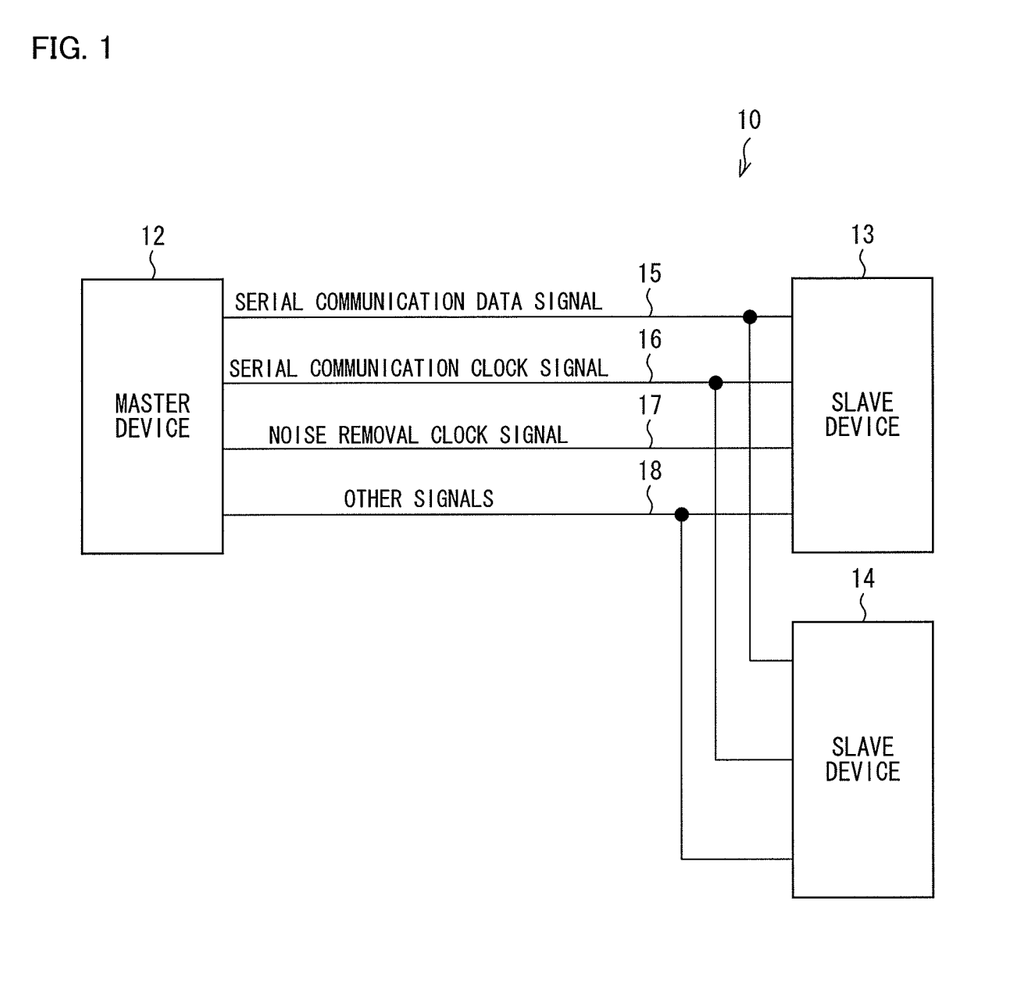
FIG. 1 is a block diagram showing a configuration of a serial data communication device in accordance with an embodiment of the present invention.

The following description will discuss a whole configuration of a serial data communication device with reference to FIG. 1.

FIG. 1 is a block diagram showing a configuration of the serial data communication device in accordance with the present embodiment.

As shown in FIG. 1, a serial data communication device 10 includes a master device 12 and slave devices 13 and 14.

The master device 12 and the slave devices 13 and 14 are connected to each other with use of an I2C bus including an SCL 15 and an SDA 16. The SCL 15 is a line for transmitting a serial communication clock signal and the SDA 16 is a line for transmitting a serial communication data signal.

The slave device 13 and the slave device 14 have own addresses. The master device 12 selects a slave device and designates an address of the slave device through an SDA 16, and then communicates with the slave device.

A noise removal section 26 (see FIG. 2) is provided in the slave device 13 on a side that receives a signal from the master device 12. The noise removal section 26 is provided for removing noise from a serial communication clock signal or a serial communication data signal supplied from the master device 12 through the SCL 15 or the SDA 16, and supplying, to another section of the slave device 13, a signal from which noise is removed.

Note that, as described later, a noise removal clock signal, whose frequency is higher than that of a serial communication clock signal, is supplied to the noise removal section 26, and a serial communication clock signal or a serial communication data signal is latched with use of the noise removal clock signal. The noise is thus removed. The noise removal clock signal is supplied from the master device 12 through a line 17.

Further, other signals are supplied to the slave devices 13 and 14 from the master device 12 through the line 18.

(Configuration of Slave Device)

Figure 2:
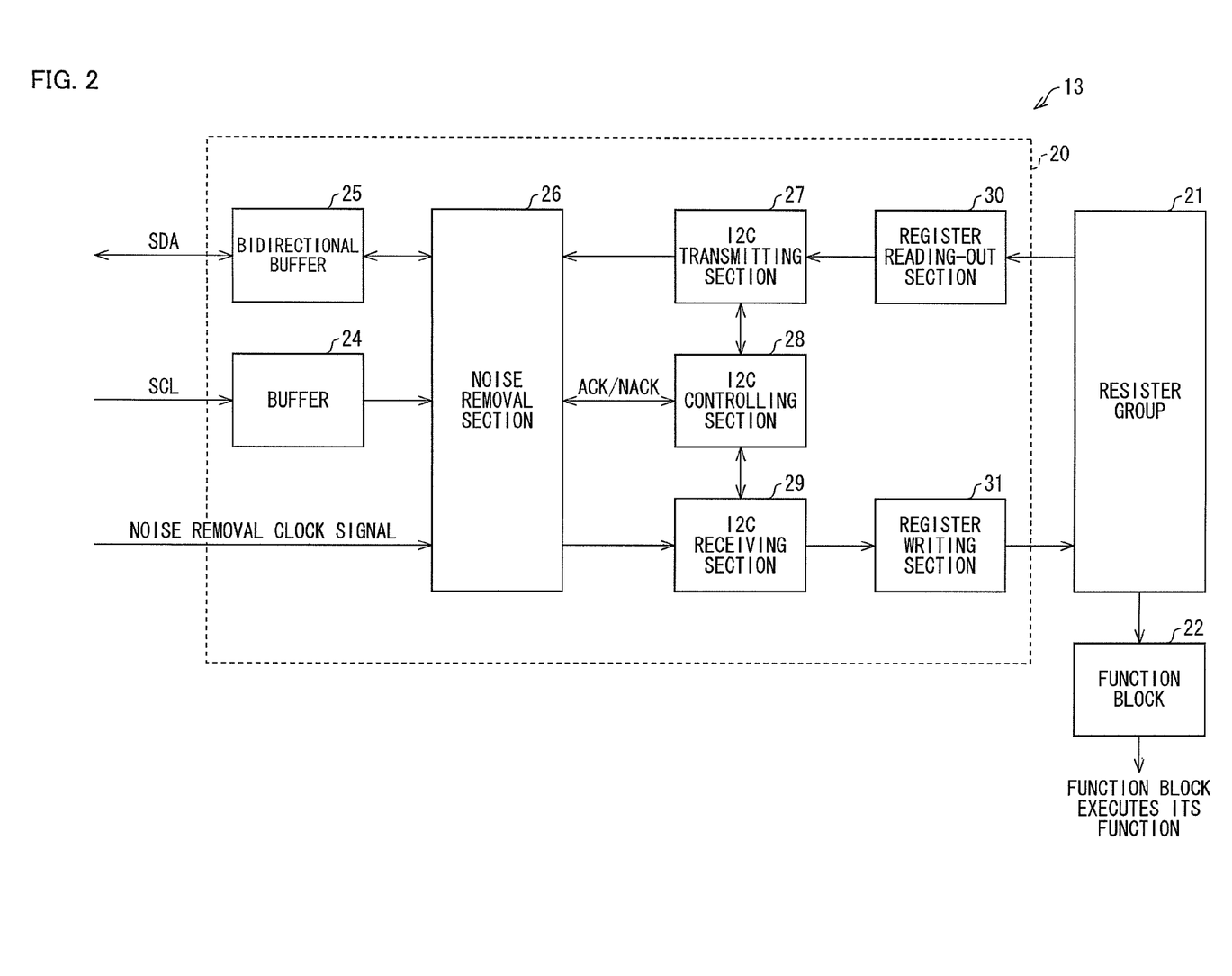
FIG. 2 is a block diagram showing a configuration of a slave device in accordance with an embodiment of the present invention.

The following description will discuss a configuration of the slave device 13 with reference to FIG. 2.

FIG. 2 is a block diagram showing the configuration of the slave device 13 in accordance with the present embodiment.

As shown in FIG. 2, the slave device 13 includes an I2C section 20, a register group 21, and a function block 22. The slave device 13 is provided for causing the register group 21 to store data written by the master device 12 and executing, on the basis of the data, a function provided in the function block 22.

The I2C section 20 is provided for operating in accordance with a specification of an interface of the I2C bus. The I2C section 20 includes a unidirectional buffer 24, a bidirectional buffer 25, the noise removal section 26, an I2C transmitting section 27, an I2C controlling section 28, an I2C receiving section 29, a register reading-out section 30, and a register writing section 31.

Upon receipt of a serial communication clock signal from the master device 12 through the SCL 15, the unidirectional buffer 24 transfers the serial communication clock signal thus received to an internal circuit.

Upon receipt of a serial communication data signal from the master device 12 through the SDA 16, the bidirectional buffer 25 transfers the serial communication data signal thus received to the internal circuit by becoming a high impedance state. Further, in order to supply data to the master device 12, the bidirectional buffer 25 transfers a data signal to the master device 12 by becoming a low-level output state or a high impedance state.

The noise removal section 26 removes noise that has been superimposed on a serial communication clock signal or on a serial communication data signal. Note that a noise removal clock signal supplied to the noise removal section 26 is a clock signal whose frequency is higher than that of the serial communication clock signal. Further, a synchronizing section (not shown) is provided in the noise removal section 26, and synchronizes a serial communication data signal with a serial communication clock signal or a noise removal clock signal and then outputs a synchronized signal. In a case where the slave device 13 becomes a master device and outputs a serial communication clock signal, the slave device 13 also synchronizes a serial communication clock signal with a system clock signal (not shown) and then outputs a synchronized signal.

In a case where the master device 12 reads out data stored in the slave device 13, the I2C transmitting section 27 receives the data stored in the register group 21 via the register reading-out section 30. Then, the I2C transmitting section 27 sends the data through the SDA 16 via the noise removal section 26 and the bidirectional buffer 25.

The I2C controlling section 28 controls to switch input and output of the bidirectional buffer 25 at a predetermined timing. The I2C controlling section 28 controls not only such a timing of switching of input and output but also a timing at which the I2C transmitting section 27 transmits data to the master device 12 and a timing at which the I2C receiving section 29 transmits data to the register writing section 31 (described below).

The I2C receiving section 29 determines whether or not a slave address contained in the data received from the master device 12 is identical with a slave address of the slave device 13. In a case where the slave address thus received is not identical with the slave address of the slave device 13, or in a case where the slave address is busy and therefore the slave device 13 cannot receive the data, the I2C receiving section 29 transmits a command to the I2C controlling section 28 so that the I2C controlling section 28 causes (A) the bidirectional buffer 25 to become a high impedance state and (B) "NACK" to be communicated to the master device 12.

In a case where the data received from the master device 12 is stored in the slave device 13, the I2C receiving section 29 writes the data to a register of the register group 21 via the register writing section 31.

The register group 21 includes a large number of registers, and data transferred from the master device 12 is written to the register group 21. When the data is read out by a reading section (which is provided between the register group 21 and the function block 22; not shown), the function block 22 can achieve its function. Note that examples of the function of the function block 22 encompass a liquid crystal display circuit and an image capturing circuit including a CCD circuit.

The noise removal section 26 latches, with use of a noise removal clock signal whose frequency is higher than the serial communication clock signal, a serial communication clock signal supplied from the master device 12 through the SCL 15 or a serial communication data signal supplied from the master device 12 through the SDA 16. Then the noise removal section 26 takes in the serial communication clock signal or the serial communication data signal.

Figure 3:
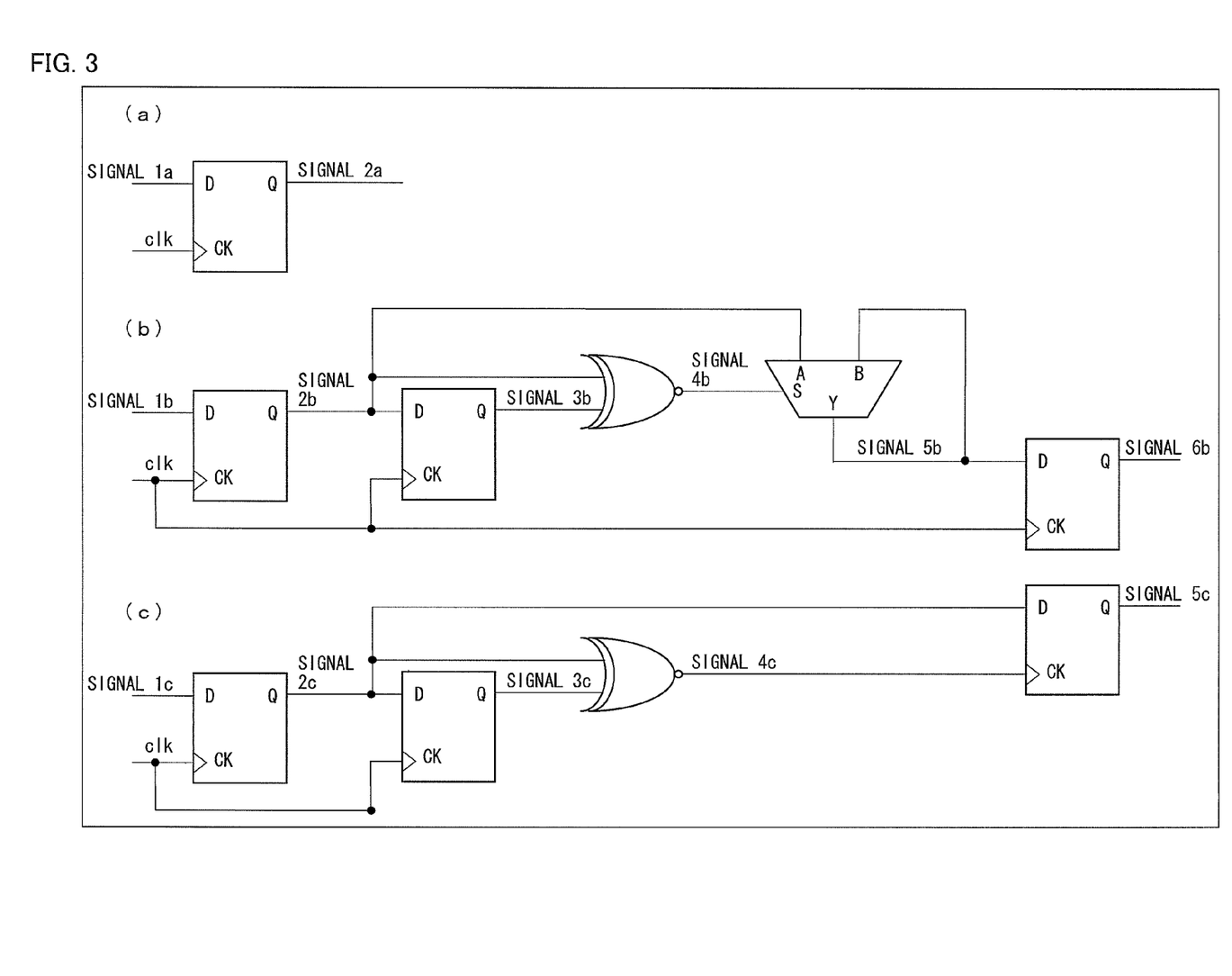

The following description will discuss specifically a configuration of the noise removal section 26 with reference to (a) through (c) of FIG. 3.

(a) of FIG. 3 is a circuit diagram showing an example configuration of the noise removal section 26 in accordance with the present embodiment.

As shown in (a) of FIG. 3, the noise removal section 26 is configured by one D-flip-flop circuit, and can remove noise by latching a serial communication clock signal or a serial communication data signal with use of a noise removal clock signal.

Figure 4:
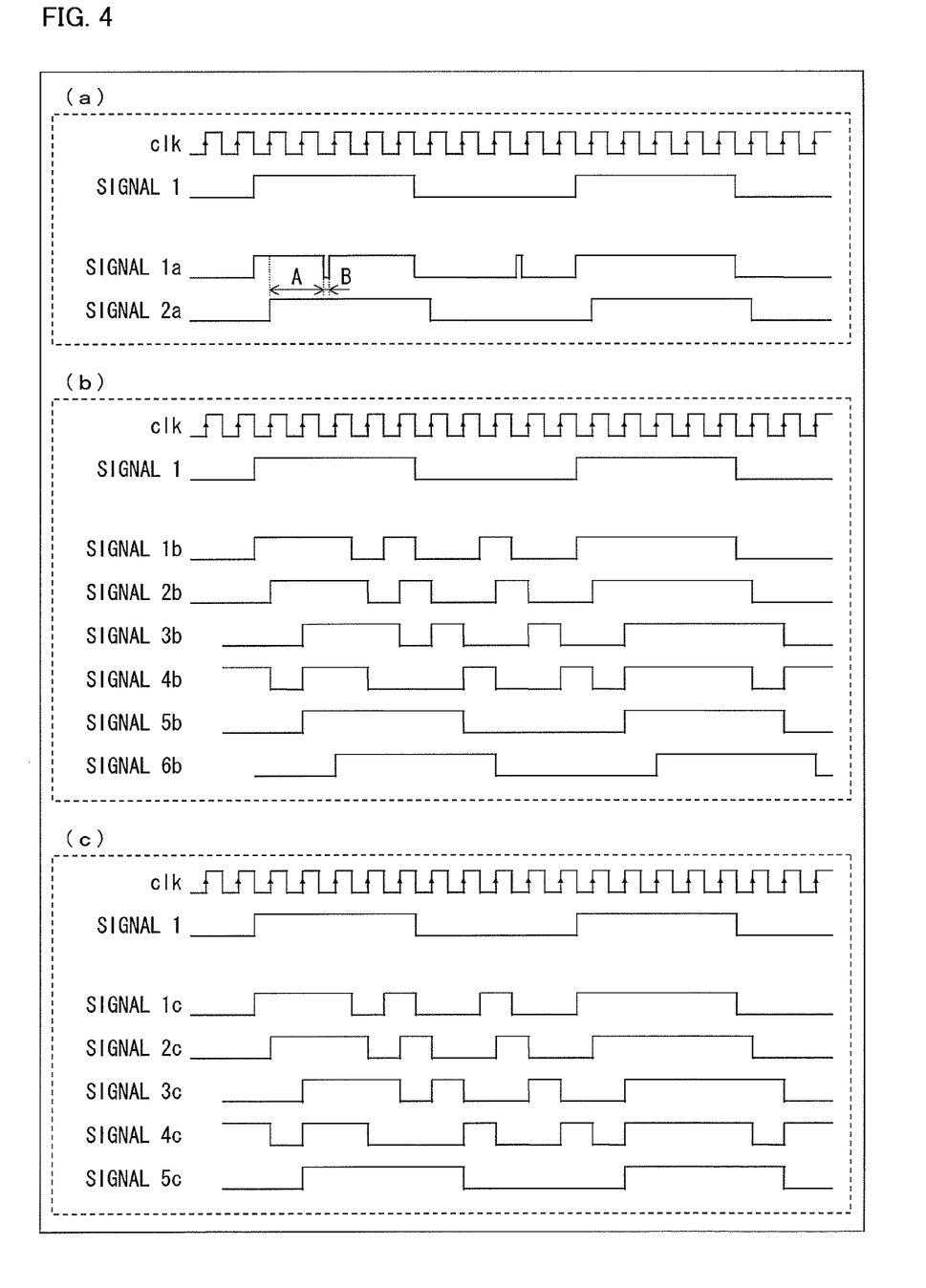

(a) of FIG. 4 is a signal waveform diagram explaining that the noise removal section 26 shown in (a) of FIG. 3 removes noise.

A signal 1 is a serial communication clock signal or a serial communication data signal, which is necessary to be supplied, and a signal clk is a noise removal clock signal whose frequency is satisfactorily higher than that of the signal 1.

In a case where noise is superimposed on the signal 1 and the signal 1 becomes a signal 1a as shown in (a) of FIG. 4, the signal 1a is supplied to an input (D) terminal of the D-flip-flop circuit shown in (a) of FIG. 3 and a clock signal clk whose frequency is high is supplied to a clock (CK) terminal of the D-flip-flop circuit. Then a value of the signal 1a is supplied from an output (Q) terminal at a rising edge of the clock signal clk, and the value is maintained until a rising edge of a next clock signal clk, so that a signal 2a 1 from which noise superimposed on the signal 1 has been removed is supplied from the output terminal of the D-flip-flop circuit. That is, the noise removal section 26 configured by one D-flip-flop circuit can remove noise that has not occurred at a rising edge of a clock signal clk by latching one time a serial communication clock signal or a serial communication data signal.

Note that, in order to remove noise more surely, a latched signal and an unlatched signal are compared with each other. In a case where the latched signal and the unlatched signal are at the same level, those signals are set as effective signals, meanwhile, in a case where the latched signal and the unlatched signal are at different levels, those signals maintain their effective signal levels. For example, the signal 2a and the signal 1a are compared with each other. In an A part, the signal 2a and the signal 1a are at the same level, so that a signal of an H level in the A part is set as an effective signal. Meanwhile, in the B part, the signal 2a and the signal 1a are at different levels, so that the signal 1a maintain its level at the H level that has been set in the A part. By employing the above configuration, it is possible to remove noise more surely.

(b) of FIG. 3 is a circuit diagram showing another example configuration of the noise removal section 26.

As shown in (b) of FIG. 3, the noise removal section 26 includes a D-flip-flop circuit, a D-flip-flop circuit, an NOR circuit, a data selector circuit, and a D-flip-flop circuit.

(b) of FIG. 4 is a signal waveform diagram explaining that the noise removal section 26 shown in (b) of FIG. 3 removes noise.

A signal 1 is a serial communication clock signal or a serial communication data signal, which is necessary to be supplied, and a signal clk is a noise removal clock signal whose frequency is satisfactorily higher than that of the signal 1.

In a case where noise is superimposed on the signal 1 and the signal 1 becomes a signal 1a as shown in (b) of FIG. 4, the signal 1b is supplied to an input (D) terminal of the D-flip-flop circuit shown in (b) of FIG. 3 and a clock signal clk whose frequency is high is supplied to a clock (CK) terminal of the D-flip-flop circuit. Then a value of the signal 1a is supplied from an output (Q) terminal at a rising edge of the clock signal clk, and the value is maintained until a rising edge of a next clock signal clk, so that a signal 2b shown in (b) of FIG. 4 is supplied from the output terminal of the D-flip-flop circuit.

Next, the signal 2b is supplied to an input (D) terminal of another D-flip-flop circuit shown in (b) of FIG. 3. The clock signal clk whose frequency is high is supplied to a clock (CK) terminal, and then a value of the signal 2b is supplied from an output (Q) terminal at a rising edge of the clock signal clk, and the value is maintained until a rising edge of a next clock signal clk. Therefore the signal 3b shown in (b) of FIG. 4 is outputted from the output terminal of the D-flip-flop circuit.

Then, the signal 3b and the signal 2b are supplied to an input terminal of the NOR circuit shown in (b) of FIG. 3. Then, a signal 4b shown in (b) of FIG. 4 is outputted from the output terminal of the NOR circuit.

After that, the signal 4b is supplied, as a selecting signal, to an S terminal of the data selector circuit shown in (b) of FIG. 3. The signal 2b and a signal 5b are supplied to an A terminal and a B terminal, respectively, and a value of the signal 2b is outputted from an output (Y) terminal in a case where the signal 4b is at a high level. Meanwhile, in a case where the signal 4b is at a low level, a value of the signal 5b is outputted from the output (Y) terminal. As a result, the signal 5b shown in (b) of FIG. 4 is outputted from the output terminal of the data selector circuit.

Then, the signal 5b is supplied to an input (D) terminal of still another D-flip-flop circuit shown in (b) of FIG. 3. A clock signal clk whose frequency is high is supplied to a clock (CK) terminal, and a value of the signal 5b is outputted from an output (Q) terminal at a rising edge of the clock signal clk. Then the value is maintained until a next rising edge of the clock signal clk. As a result, a signal 6b shown in (b) of FIG. 3 is outputted from an output terminal of the D-flip-flop circuit. The D-flip-flop circuit is provided for removing noise (not shown) that has occurred inside the noise removal section 26 by latching the signal 5b with use of the clock signal clk whose frequency is high.

By latching a serial communication clock signal or a serial communication data signal several times as described above, the noise removal section 26 including the circuits shown in (b) of FIG. 3 can remove, from the clock signal clk, noise that has been superimposed on the signal 1 during one cycle.

(c) of FIG. 3 is a circuit diagram showing still another example configuration of the noise removal section 26.

As shown in (c) of FIG. 3, the noise removal section 26 includes a D-flip-flop circuit, a D-flip-flop circuit, a NOR circuit, and a D-flip-flop circuit.

(c) of FIG. 4 is a signal waveform diagram explaining that the noise removal section 26 shown in (c) of FIG. 3 removes noise.

A signal 1 is a serial communication clock signal or a serial communication data signal, which is necessary to be supplied, and a signal clk is a noise removal clock signal whose frequency is satisfactorily higher than that of the signal 1.

In a case where noise is superimposed on the signal 1 and the signal 1 becomes a signal 1c as shown in (c) of FIG. 4, the signal 1c is supplied to an input (D) terminal of the D-flip-flop circuit shown in (c) of FIG. 3 and a clock signal clk whose frequency is high is supplied to a clock (CK) terminal of the D-flip-flop circuit. Then a value of the signal 1c is supplied from an output (Q) terminal at a rising edge of the clock signal clk, and the value is maintained until a rising edge of a next clock signal clk, so that a signal 2c shown in (c) of FIG. 4 is supplied from the output terminal of the D-flip-flop circuit.

Next, the signal 2c is supplied to an input (D) terminal of another D-flip-flop circuit shown in (c) of FIG. 3. The clock signal clk whose frequency is high is supplied to a clock (CK) terminal, and then a value of the signal 2c is supplied from an output (Q) terminal at a rising edge of the clock signal clk, and the value is maintained until a rising edge of a next clock signal clk. Therefore the signal 3c shown in (c) of FIG. 4 is outputted from the output terminal of the D-flip-flop circuit.

Then, the signal 3c and the signal 2c are supplied to an input terminal of the NOR circuit shown in (c) of FIG. 3. Then, a signal 4c shown in (c) of FIG. 4 is outputted from the output terminal of the NOR circuit.

Then, the signal 2c is supplied to an input (D) terminal of still another D-flip-flop circuit shown in (c) of FIG. 3. A signal 4c is supplied to a clock (CK) terminal, and a value of the signal 2c is outputted from an output (Q) terminal at a rising edge of the signal 4c, and the value is maintained until a next rising edge of a clock signal 4c. As a result, a signal 5c shown in (c) of FIG. 4 is outputted from an output terminal of the D-flip-flop circuit.

By latching a serial communication clock signal or a serial communication data signal several times as described above, the noise removal section 26 including the circuits shown in (c) of FIG. 3 can remove noise that has been superimposed on the signal 1.

By using the circuit configuration shown in (b) of FIG. 3 or (c) of FIG. 3, the same type noise can be removed.

In the slave device 13, the noise removal section 26 including the above circuit or circuits is provided on a side that receives a signal from the master device 12. It is therefore possible to remove noise of a serial communication clock signal that has been inputted from the master device 12 through the SCL 15 or a serial communication data signal that has been inputted from the master device 12 through the SDA 16.

In the present embodiment, noise removal is performed on a serial communication clock signal or a serial communication data signal by providing a single noise removal section 26 configured as described above, however, the present invention is not limited thereto. For example, noise removal may be performed with use of two signal noise removal sections 26 so that both noise of a serial communication clock signal and that of a serial communication data can be removed.

Further, in the present embodiment, the configuration of the noise removal section 26 has been described by citing, as examples, the circuit configurations shown in (a) of FIG. 3 and (b) of FIG. 3, however, the present invention is not limited thereto. The noise removal section 26 can be appropriately provided, if necessary, as long as the configuration of the noise removal section 26 can remove noise superimposed on a signal by latching a serial communication clock signal or a serial communication data signal with use of a clock signal clk whose frequency is high.

Further, in order to remove noise in the present embodiment, the noise removal section 26 is provided only for the slave device 13, however, noise removal sections 26 may be provided for the slave devices 13 and 14, respectively. That is, if necessary, noise removal sections 26 may be provided in slave devices which require noise removal to remove noise superimposed on signals.

Further, in the present embodiment, the noise removal clock signal is supplied from the master device 12, however, the present invention is not limited thereto.

Further, in the present embodiment, the noise removal section 26 is provided on a side, of the slave device 13, which receives a signal from the master device 12. In the I2C method, however, the SDA 16 transmits a signal bidirectionally. Therefore, noise that has been superimposed on a signal inputted from the master device 12 through the SDA 16 may be removed by providing a noise removal section 26 on a side, of the master device 12, which receives a signal from the slave device 13.

In a case where data is transmitted between a master device and a slave device with use of the I2C method as in the present embodiment, the data is likely to be affected by noise particularly. Reasons of this are specifically described below.

(1) Data is transmitted between a master device and a slave device through a bidirectional SDA, so that impedance of the SDA is high. This is likely to cause malfunction caused by noise.

(2) Some signals transmitted through an SDA serve as commands such as a start condition and a stop condition. This is likely to cause malfunction caused by noise.

(3) The same data signal or the same clock signal is used in common by a plurality of slave devices, so that an open collector or an open drain device is used as an output section of each signal section. This configuration causes the data signal or the clock signal to have an H level with use of a pull-up resistance. Therefore, impedance of each signal is high. This is likely to cause malfunction caused by noise.

(4) The same data signal or the same clock signal is used in common by a plurality of slave devices. Therefore, the noise removal section 26 misidentifies communication with another slave device, and is likely to cause malfunction.

(5) Sync signals such as a start pulse and an enable signal are not used because of serial communication. This is likely to cause malfunction caused by noise.

For the above reasons, a serial communication system with use of the I2C method, such as that in the present embodiment, is particularly effective in the present invention.

However, the present invention is not necessarily limited to the I2C method, and is effective in a serial data communication method in which noise is likely to occur.

Note that, in the present embodiment, an SCL (clock line) is unidirection, and a clock may be transmitted between a master device and a slave device with use of a bidirectional SCL. The bidirectional SCL has high impedance. This is likely to cause malfunction caused by noise, so that the present invention is particularly effective.

EXAMPLE 1

Figure 5:
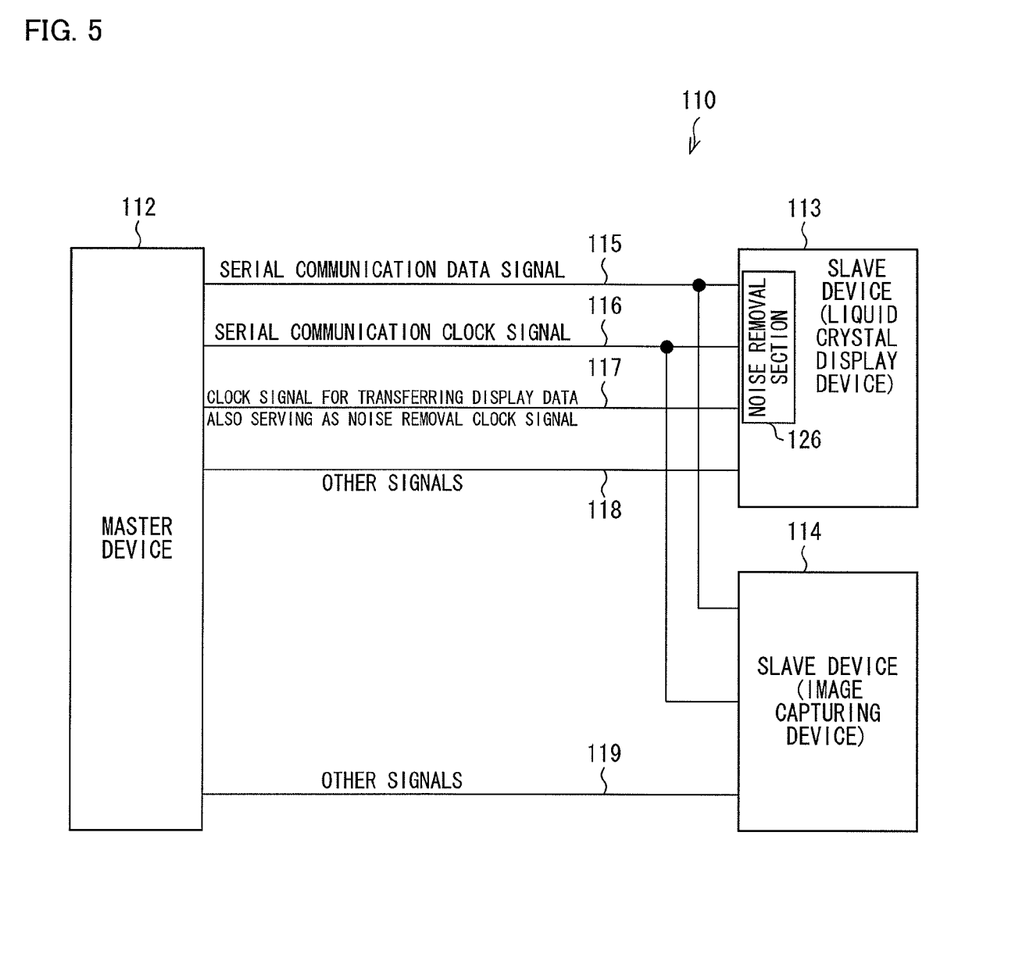
FIG. 5 is a block diagram explaining an electronic device in accordance with Example of the present invention.

The following description will discuss an Example with reference to FIG. 5.

Note that Example 1 cites, as an example of a serial data communication device, an electronic device (e.g., cell phone) including a liquid crystal display device.

FIG. 5 is a block diagram explaining an electronic device in accordance with Example 1.

As shown in FIG. 5, the electronic device 110 includes a master device 112, a liquid crystal display device 113 which is a slave device, and an image capturing device 114.

The master device 112 and each of the liquid crystal display device 113 and the image capturing device 114 are connected through an I2C bus including an SCL 115 and an SDA 116.

A noise removal section 126 is provided on a side, of the liquid crystal display device 113, which receives a signal from master device 112. The noise removal section 126 remove noise from a serial communication data signal inputted from the master device 112 through the SDA 116 or a serial communication clock signal inputted from the master device 112 through the SCL 115.

The noise removal section 126 can remove noise superimposed on a serial communication data signal or a serial communication clock signal by latching the serial communication data signal or the serial data communication clock signal with use of a noise removal clock signal whose frequency is high. The noise removal section 126 can be configured by the circuit (or circuits) that has (or have) already been described, so that description of a configuration of the noise removal section 126 is omitted.

Note that the noise removal clock signal also serves as a display data transferring clock signal which is supplied to the liquid crystal display device 113, and is supplied from the master device 112 through a line 118.

For example, in the I2C method, a frequency of a serial communication clock signal is normally 400 kHz or less. Meanwhile, a display data transferring clock signal depends on a display resolution, and, in a case of VGA (640×480), a frequency of the clock signal is about 20 MHz, so that the frequency is satisfactorily higher than that of the serial communication clock signal. Therefore the serial communication clock signal can also serve as a noise removal clock signal.

This makes it possible to provide a noise removal clock signal, without adding another line.

In Example 1, the noise removal clock signal can also serve as the display data transferring clock signal, however, the display data transferring clock signal is divided and a divided clock signal can be used as a noise removal clock signal.

For example, the display data transferring clock signal having about 20 MHz is divided into eight, so that a divided clock signal having about 2.5 MHz can be used as a noise removal clock signal.

Further, the liquid crystal display device 113 and the image capturing device 114 receive other signals through the line 118 and a line 119, respectively, from the master device 112.

Examples of the other signals supplied to the liquid crystal display device 113 encompass a display data signal, a vertical sync signal, and a horizontal sync signal.

It is preferable that the serial data communication method of the present invention compare the at least one of the data signal and the clock signal before the latching with the at least one of the data signal and the clock signal after the latching; and set a level of the at least one of the data signal and the clock signal after the latching in such a way that, in a case where the level of the at least one of the data signal and the clock signal after the latching is identical with a level of the at least one of the data signal and the clock signal before the latching, the level of the at least one of the data signal and the clock signal after the latching is set at such a level which is identical between the at least one of the data signal and the clock signal after the latching and the at least one of the data signal and the clock signal before the latching, and, in a case where the level of the at least one of the data signal and the clock signal after the latching is different from the level of the at least one of the data signal and the clock signal before the latching, the level of the at least one of the data signal and the clock signal after the latching is set at a level which has been set at a latching immediately before the latching is carried out.

According to the above method, in a case where the level of the at least one of the data signal and the clock signal after the latching is different from the level of the at least one of the data signal and the clock signal before the latching because of noise, the level of the at least one of the data signal and the clock signal after the latching is set at a level which has been set at a latching immediately before the latching is carried out. This makes it possible to remove noise more surely.

In the serial data communication method of the present invention the communication may be performed by an I2C method.

Noise is likely to occur particularly in the I2C method, however, it is possible to effectively remove noise by using the above method.

In the serial data communication device of the present invention, it is preferable that the noise removal section provide a flip-flop circuit.

According to the configuration, noise superimposed on at least one of the clock signal and the data signal can be removed with a simple configuration. This can reduce occurrence of malfunction.

It is preferable that, in the serial data communication device of the present invention, the noise removal section compare the at least one of the data signal and the clock signal before latching with the at least one of the data signal and the clock signal after latching, and set a level of the at least one of the data signal and the clock signal after the latching in such a way that, in a case where the level of the at least one of the data signal and the clock signal after the latching is identical with a level of the at least one of the data signal and the clock signal before the latching, the level of the at least one of the data signal and the clock signal after the latching is set at such a level which is identical between the at least one of the data signal and the clock signal after the latching and the at least one of the data signal and the clock signal before the latching, and, in a case where the level of the at least one of the data signal and the clock signal after the latching is different from the level of the at least one of the data signal and the clock signal before the latching, the level of the at least one of the data signal and the clock signal after the latching is set at a level which has been set at a latching immediately before the latching is carried out.

According to the above configuration, in a case where the level of the at least one of the data signal and the clock signal after the latching is different from the level of the at least one of the data signal and the clock signal before the latching because of noise, the level of the at least one of the data signal and the clock signal after the latching is set at a level which has been set at a latching immediately before the latching is carried out. This makes it possible to remove noise more surely.

The serial data communication device of the present invention may further include: a plurality of slave devices, wherein at least one of the data line and the clock line is used in common by the plurality of slave devices.

In a case where the same data line or the same clock line is used in common by the plurality of slave devices, there arises a risk that, when noise is superimposed on a signal, the serial data communication device misidentifies communication of other slave devices and malfunctions. Therefore, the present invention is particularly effective.

In the serial data communication device of the present invention, the communication may be performed by an I2C method.

In the I2C method, noise is likely to occur particularly. However, the above configuration can remove the noise effectively.

In the serial data communication device of the present invention, the clock signal may be bidirectionally communicated through the clock line. A bidirectional clock line has high impedance, and noise is likely to be superimposed. Therefore the present invention is particularly effective.

In the serial data communication device of the present invention, the data signal may serve as a command depending on a phase relation between the data signal and the clock signal.

According to the configuration, in a case where a data signal serves as a command, there arises a risk of malfunction when noise is superimposed on the data signal, so that the present invention is particularly effective.

Further, there is no need to provide another signal line for commands. This can reduce the number of signal lines.

In the serial data communication device of the present invention, at least one of the plurality of slave devices may be a display device.

In the serial data communication device of the present invention, it is preferable that: the display device receive a display data transferring clock signal; and the display data transferring clock signal be the second clock signal.

According to the configuration, there is no need to provide another clock signal, and the number of signal lines can be reduced.

In the serial data communication device of the present invention, it is preferable that the second clock signal be a signal obtained by dividing the display data transferring clock signal supplied to the display device.

According to the configuration, there is no need to provide another clock signal, and the number of signal lines can be reduced.

The present invention is not limited to the description of the embodiment above, and can be modified in numerous ways by a skilled person as long as such modification falls within the scope of the claims. An embodiment derived from a proper combination of technical means disclosed in different embodiments is also encompassed in the technical scope of the present invention.

INDUSTRIAL APPLICABILITY

The present invention can be suitably applicable to an electronic device connected with use of an I2C bus.

The invention claimed is:

1. A serial data communication device, in which a master device and a slave device are connected to each other with use of at least a data line and a clock line, the serial data communication device comprising:
   a noise removal section for latching at least one of a data signal communicated through the data line and a clock signal communicated through the clock line, the latching being carried out with use of a second clock signal whose frequency is higher than that of the clock signal, and taking in the at least one of the data signal and the clock signal, wherein the noise removal section compares the at least one of the data signal and the clock signal before latching with the at least one of the data signal and the clock signal after latching, and sets a level of the at least one of the data signal and the clock signal after the latching in such a way that, in a case where the level of the at least one of the data signal and the clock signal after the latching is identical with a level of the at least one of the data signal and the clock signal before the latching, the level of the at least one of the data signal and the clock signal after the latching is set at such a level which is identical between the at least one of the data signal and the clock signal after the latching and the at least one of the data signal and the clock signal before the latching, and in a case where the level of the at least one of the data signal and the clock signal after the latching is different from the level of the at least one of the data signal and the clock signal before the latching, the level of the at least one of the data signal and the clock signal after the latching is set at a level which has been set at a latching immediately before the latching is carried out.

2. The serial data communication device as set forth in claim 1, wherein the noise removal section provides a flip-flop circuit.

3. The serial data communication device as set forth in claim 1, further comprising:
   a plurality of slave devices,
   wherein at least one of the data line and the clock line is used in common by the plurality of slave devices.

4. The serial data communication device as set forth in claim 1, wherein the communication is performed by an I2C method.

5. The serial data communication device as set forth in claim 1, wherein the clock signal is bidirectionally communicated through the clock line.

6. The serial data communication device as set forth in claim 1, wherein the data signal serves as a command depending on a phase relation between the data signal and the clock signal.

7. The serial data communication device as set forth in claim 3, wherein at least one of the plurality of slave devices is a display device.

8. The serial data communication device as set forth in claim 7, wherein:
   the display device receives a display data transferring clock signal; and
   the display data transferring clock signal is the second clock signal.

9. The serial data communication device as set forth in claim 7, wherein the second clock signal is a signal obtained by dividing a display data transferring clock signal supplied to the display device.

* * * * *